United States Patent [19]

Steuben

[11] 4,408,778
[45] Oct. 11, 1983

[54] AUTOMATICALLY CONNECTING HITCH

[76] Inventor: Ronald G. Steuben, Box 191, Everly, Iowa 51338

[21] Appl. No.: 314,857

[22] Filed: Oct. 26, 1981

[51] Int. Cl.³ ............................................. B60D 1/00
[52] U.S. Cl. ................................... 280/509; 172/275; 280/510
[58] Field of Search ............... 280/508, 507, 509, 510, 280/511, 514, 515, 479 R, 479 A, 415 R, 415 A, 461 A, 504; 172/248, 677–680, 661, 275

[56] References Cited

U.S. PATENT DOCUMENTS 3,542,399 11/1970 Myers ............................. 280/479 A

FOREIGN PATENT DOCUMENTS 875270 8/1961 United Kingdom ................ 280/504

Primary Examiner—Joseph F. Peters, Jr.
Assistant Examiner—Mitchell J. Hill

[57] ABSTRACT

An automatic latching device for connecting a tractor drawbar to a wagon or implement being towed in which connecting jaws are adapted to be closed around a pin in the tongue of the pulled device. The device actuating the closing includes a tapered pin adapted to force the jaws to close as the jaws are raised from a connecting level near the ground to a pulling level at approximately the drawbar height.

8 Claims, 7 Drawing Figures

AUTOMATICALLY CONNECTING HITCH

BACKGROUND AND SUMMARY OF THE INVENTION

This invention pertains to automatically latching or quick connecting devices usable to connect a tractor device to a pulled device particularly in use on farms.

For various reasons the idea of being able to connect a farm tractor to an implement or wagon is very appealing. Many farm implements have tongues requiring considerable force to raise to the height necessary to connect to the tractor drawbar. Thus, these implements may require some sort of jack on the tongue to hold them up at the proper level for connection.

Even the implements with light tongue weights require one to dismount from the tractor in order to align the holes in the clevis on the tongue with the hole in the drawbar and to drop the hitch pin into place. In many such instances it may be desirable to have one person driving the tractor while the other lifts the tongue and inserts the pin.

Several devices have been tried to overcome the problems of heavy tongues but I am aware of patents covering such devices.

By my invention I provide a device having an automatic connecting device adapted to engage a pin in the tongue of the device to be pulled and then to be raised to drawbar height and at that point to be locked positively onto the pin and be ready for pulling.

FIGURES

Figure 3:
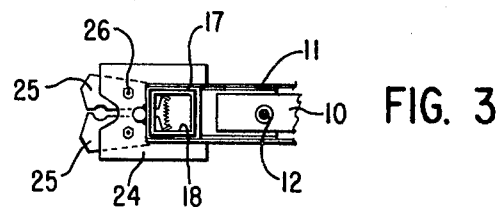
Figure 1:
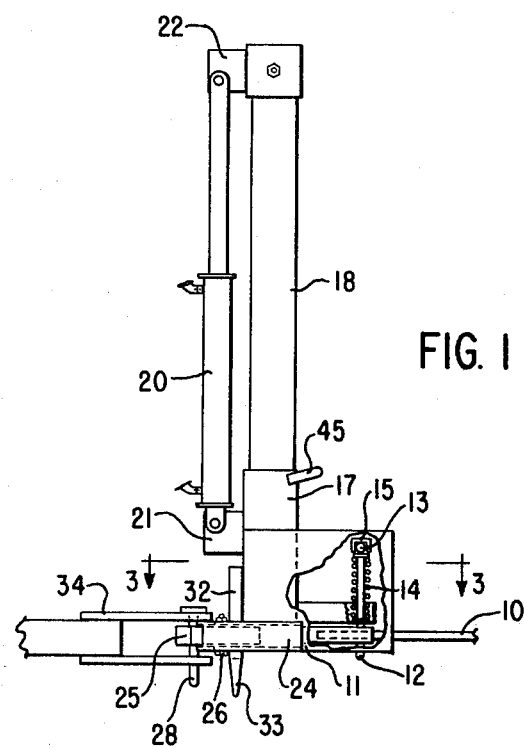
Figure 2:
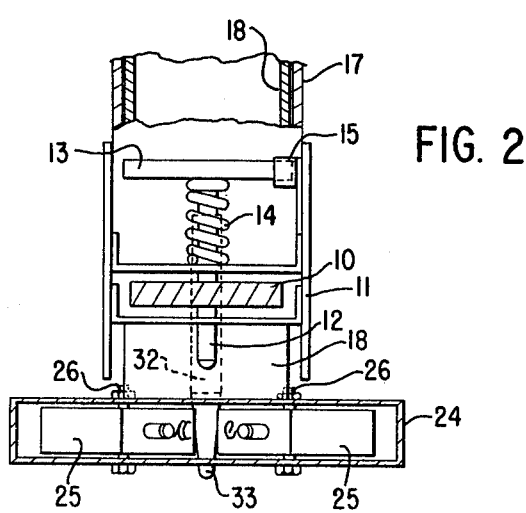
Figure 4:
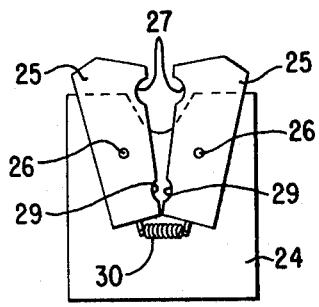
Figure 5:
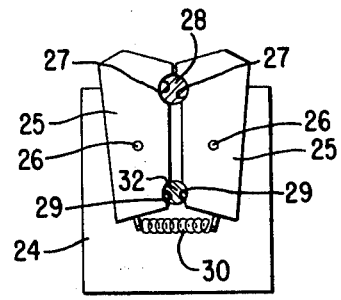
Figure 6:
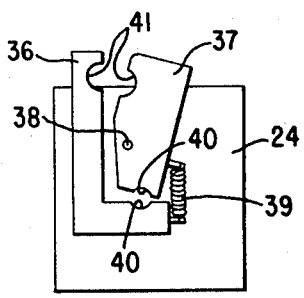
Figure 7:
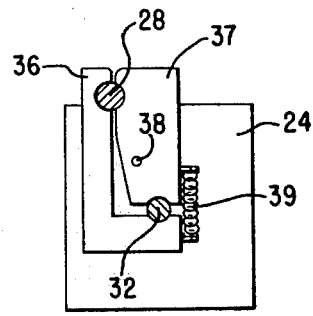

FIG. 1 is a side elevational view of my device on a tractor drawbar,

FIG. 2 is a rear elevational view of the device of FIG. 1 with the column not fully raised, FIG. 3 is a section view to an enlarged scale of my device separated from the tractor and implement, from line 3—3 of FIG. 1, FIG. 4 is a top plan view of the jaws of my device in an open state, FIG. 5 is a view similar to FIG. 4 showing the jaws forced closed, FIG. 6 is a view similar to FIG. 4 showing alternate types of jaws in an open state, and FIG. 7 is a view similar to FIG. 6 showing the jaws closed.

DESCRIPTION

Briefly my device comprises a pillar to be attached to a tractor drawbar. Latching jaws are pivoted onto a column telescopically engaged with the pillar. The jaws are adapted to be normally open when the column is at any location except its raised position where a tapered pin forces the jaws to a closed position in which they tightly grasp a pin on the device to be pulled.

More specifically, and referring to the drawings, I provide a device adapted to be mounted on a tractor drawbar 10. Specifically, a clevis or enclosed housing 11 is provided to surround the drawbar. A pin 12 provides for the pulling connection. I show this pin as having a T-handle 13 and spring 14 to bias the pin upward. A socket 15 adapted to engage the T-handle may then be provided to hold the pin downward in place. Release is accomplished by pressing downward on the T-handle, turning it slightly and then releasing it to allow the spring 14 to retract the pin 12. However, other types of hitch pins may be used to make this connection.

The housing 11 is attached to a pillar 17 preferably of square or rectangular cross section. The pillar is hollow and, slidably disposed within it, is a column 18 of mating cross section. The sliding movement and the position of the column 18 within the pillar 17 is controlled by a hydraulic piston and cylinder assembly 20 connected between a bracket 21 on the pillar 17 and a second bracket 22 on the upper end of the column 18.

At the base of the column 18 I provide a box-like enclosure 24 firmly fixed to the lower end of that column. Within this enclosure are a pair of jaws 25 pivoted on bolts 26 or similar axes. The form of those jaws is best shown in FIGS. 4 and 5. Principally the jaws include matching notches 27 which, when the jaws are in the closed position shown in FIG. 5, form nearly a closed circle. Thus when closed, the jaws will securely hold a pin 28. Normally, the pin 28 will be a hitch pin for a farm implement or wagon to be pulled. The jaws 25 also are formed with arcuate notches 29 near the ends of the jaws opposite the pivots 26 from the first notches. A tension spring 30 may be used to bias the jaws to the open position shown in FIG. 4.

As shown in FIG. 1, a pin 32 is fixed to the lower end of the pillar 17 and extends beyond that lower end. The extension 33 is tapered with a fairly long taper. This pin is aligned with the notches 29 when the device is assembled so that when the enclosure is carried by the column 18 to a lower position well beneath the pin 32, the jaws 25 are pulled by the spring 30 to the open position shown in FIG. 4. When the column 18 is raised within the pillar 17, the jaws are carried to a point where the tapered end 33 engages the walls of the notches 29 and as the jaws rise, the taper forces these notches 29 apart. This causes the other ends of the jaws 25 to close, requiring the notches 27 to close. Any pin engaged in those notches is then securely held within the jaws. If the pin 28 is a hitch pin for a farm implement having a clevis shaped tongue end 34, then the implement is in a pulled arrangement with the drawbar 10 of the tractor.

An alternative type of pin gripping jaws is shown in FIGS. 6 and 7. This device operates similarly to that first described, but instead of two similar moving jaws, this device uses one fixed jaw 36 attached to the bottom of the enclosure 24. A second jaw 37 is pivotally attached to that enclosure at a pivot axis 38. A spring 39 attached between the two jaws is arranged to bias the jaws to the open position shown in FIG. 6.

In this form as well as the first described embodiment, the jaws are adapted to be pressed together by the tapered pin 32 acting in the same manner as in the first described embodiment. Notches 40 receive the pin 32 and forces the jaws together to a point where the holding notches 41 grasp and hold the hitch pin 28. Thus, the operation of the device with these jaws is exactly similar to that first described.

In either embodiment, a handle 45 may be fixed to the pillar means 17 for ease in handling and carrying the device.

I claim:

1. For hitching a tractor drawbar to a pulled implement having a tongue, means comprising connecting means adapted to be connected to said drawbar, pillar means on said connecting means, column means slidably disposed on said pillar means, jaws connected to said column means, at least a first jaw being pivotally mounted relative to said column means, said jaws being formed with notches adapted to embrace a pin on said tongue, said jaws being normally opened but being engageable by means on said pillar means to force said first mounted jaw closed when said column means is slidably moved to a pulling position.

2. The device of claim 1 in which said column means carries an enclosure means open at least one end, said jaws being engaged with said enclosure.

3. The device of claim 1 in which said means on said pillar means to close said jaws is a pin tapered at the end engageable with said jaws.

4. The device of claim 1 in which a hydraulic piston-cylinder assembly is connected between said pillar means and said column means whereby the sliding position between them is determined.

5. The device of claim 3 in which each of said jaws is formed to provide one notch to receive said pin on said pillar means and a second notch adapted to substantially completely embrace said pin on said tongue.

6. The device of claim 5 in which both jaws are pivotally connected to said column means.

7. The device of claim 1 in which spring means engaged with each of said pivotally mounted jaws biases said jaws to the open position.

8. The device of claim 1 in which said pillar means is carried substantially vertically, said column means being movable on said pillar means from a lower position of the jaws near the ground on which the tractor stands to an upper position of the jaws at approximately the level of said drawbar.

* * * * *